United States Patent [19]

Amano

[11] Patent Number: 5,187,511

[45] Date of Patent: Feb. 16, 1993

[54] CAMERA USING FILM WITH A MANGETIC MEMORIZING PORTION

[75] Inventor: Kenichiro Amano, Tokyo, Japan

[73] Assignee: Canon Kabushiki Kaisha, Tokyo, Japan

[21] Appl. No.: 687,035

[22] Filed: Apr. 18, 1991

[30] Foreign Application Priority Data

Apr. 20, 1990 [JP] Japan .................................. 2-102794

[51] Int. Cl.⁵ ...................... G03B 17/24; G03B 29/00; G11B 5/09
[52] U.S. Cl. ..................................... 354/106; 354/76; 360/47
[58] Field of Search ............... 354/105, 106, 107, 108, 354/76; 360/47

[56] References Cited

U.S. PATENT DOCUMENTS

| 2,628,346 | 2/1953 | Burkhart | 360/47 |
| 3,761,903 | 9/1973 | Bird Jr. et al. | 360/47 |
| 4,202,018 | 5/1980 | Stockham, Jr. | 360/47 |
| 4,864,332 | 9/1989 | Harvey | 354/21 |
| 4,974,096 | 11/1990 | Wash | 354/76 X |
| 4,996,546 | 2/1991 | Pagano et al. | 354/76 |

*Primary Examiner*—Richard A. Wintercorn
*Assistant Examiner*—Jae N. Noh
*Attorney, Agent, or Firm*—Fitzpatrick, Cella, Harper & Scinto

[57] ABSTRACT

A camera using film having a magnetic memorizing portion that includes a plurality of frames. The camera includes a writing device for writing the same information onto the same frame of the magnetic memorizing portion a plurality of times, and a varying device for automatically varying the number of times of writing by the writing device in conformity with the substance or degree of importance of the information.

34 Claims, 5 Drawing Sheets

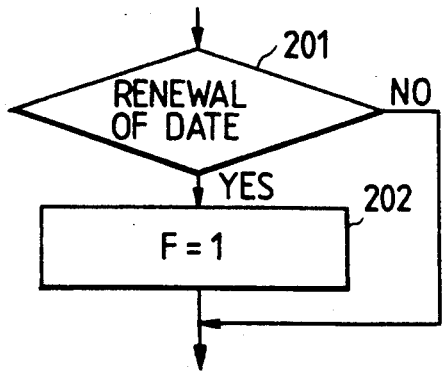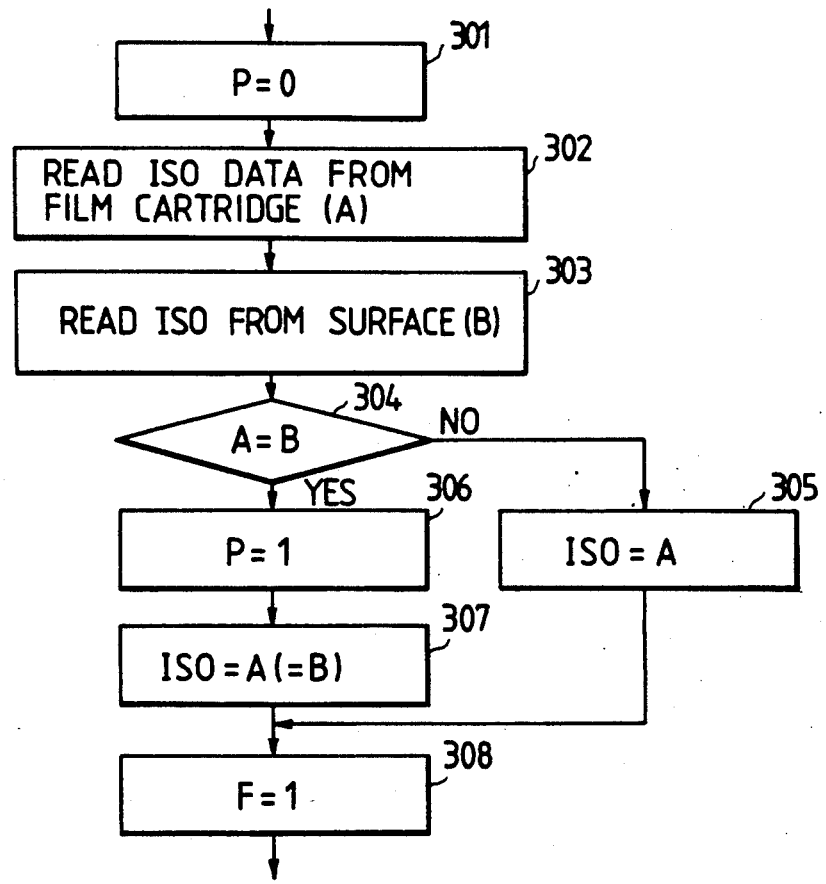

FIG.6(1) (PRIOR ART)

| # | Date(s) |
|---|---|
| 1 | 89/12/30 |
| 2 | |
| 3 | 89/12/30 |
| 4 | 89/12/30 |
| 5 | 90/1/1 |
| 6 | 90/1/1 |
| 7 | 90/1/2 |
| 8 | 90/1/2 |
| 9 | 90/1/2 |
| 10 | 90/1/2 |

FIG.6(2)

| # | Dates |
|---|---|
| 1 | 89/12/30, 89/12/30, 89/12/30, 89/12/30, 89/12/30 |
| 2 | — |
| 3 | — |
| 4 | — |
| 5 | 90/1/1, 90/1/1, 90/1/1, 90/1/1, 90/1/1 |
| 6 | — |
| 7 | 90/1/2, 90/1/2, 90/1/2, 90/1/2, 90/1/2 |
| 8 | — |
| 9 | — |
| 10 | — |

CAMERA USING FILM WITH A MANGETIC MEMORIZING PORTION

BACKGROUND OF THE INVENTION

1. Field of the Invention

This invention relates to a camera using film with a magnetic memorizing portion, which camera is provided with a magnetic head for reading information written on the magnetic memorizing portion provided on the film, and writing information onto the magnetic memorizing portion.

2. Related Background Art

In recent years, a camera using film having a magnetic memorizing portion and enabling information to be written into this magnetic memorizing portion has been proposed by U.S. Pat. No. 4,864,332, for example. In a camera of this type, design is made such that with regard to the same information, writing is effected one time for each frame.

In the above-described example of the prior art, however, writing is effected only one time with regard to all information as previously described and thus, if an error should be committed due to a fluctuation or the like of the film feeding speed during the writing or reading of information, it will be intactly transmitted as wrong information. Accordingly, it may possibly become a fatal error when that information is important information which will affect photographing.

SUMMARY OF THE INVENTION

The present invention has been made in view of the above-noted circumstances, and intends to provide a camera using film with a magnetic memorizing portion, which camera is provided with writing means for writing information onto said magnetic memorizing portion and varying means for automatically varying the number of times of the writing by said writing means in conformity with the substance of the information and solves the above-noted problem and can remarkably decrease the transmission of wrong magnetic information.

Other objects of the present invention will become apparent from the following detailed description of an embodiment of the invention.

BRIEF DESCRIPTION OF THE DRAWINGS

FIGS. 2 to 5 are flow charts showing the operations of the circuits of FIG. 1.

FIGS. 6(1) and 6(2) show the written states of date information onto a film surface by magnetic heads in cameras according to the prior art and the embodiment of the present invention, respectively.

DESCRIPTION OF THE PREFERRED EMBODIMENT

An embodiment of the present invention will hereinafter be described in detail with reference to the drawings.

Figure 1:
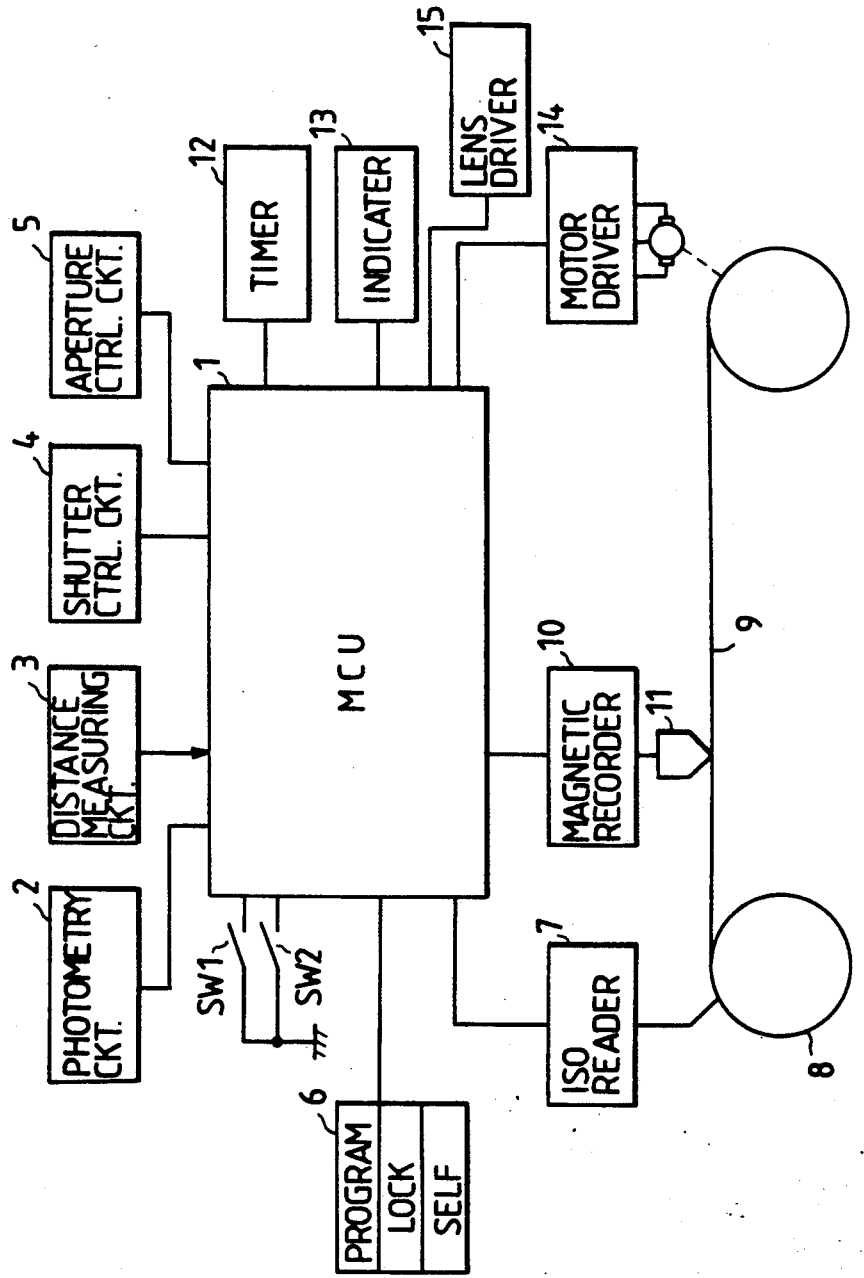
FIG. 1 is a circuit block diagram showing an embodiment of the present invention.

Referring to FIG. 1 which is a block diagram of a camera according to an embodiment of the present invention, the reference numeral 1 designates a microprocessor which governs the control of the entire camera. The reference numeral 2 denotes a photometry circuit, the reference numeral 3 designates a distance measuring circuit, the reference numeral 4 denotes a shutter control circuit, and the reference numeral 5 designates an aperture control circuit. Any of these is constructed as a well-known circuit. The reference numeral 6 denotes a main switch which, in the present embodiment, has three positions, LOCK, PROGRAM and SELF. The reference numeral 7 designates ISO reader means for reading the ISO information of film 9 constructed in a light-and-shade pattern on the surface of a film cartridge 8, the reference numeral 10 denotes a magnetic recording circuit for writing and reading information on the magnetic memorizing portion (not shown) of the film 9 by the use of a magnetic head 11, the reference numeral 12 designates a timer circuit for counting various times, the reference numeral 13 denotes an indicator circuit for indicating shutter time (TV) and aperture value (AV), the reference numeral 14 designates a motor driver circuit for effecting the feeding of the film 9, and the reference numeral 15 denotes a lens driver circuit for driving a photo-taking lens to the infocus position. SW1 designates a photometry switch, and SW2 denotes a release switch. These switches are adapted to be closed by a first stroke and a second stroke of a release button.

Figure 2:
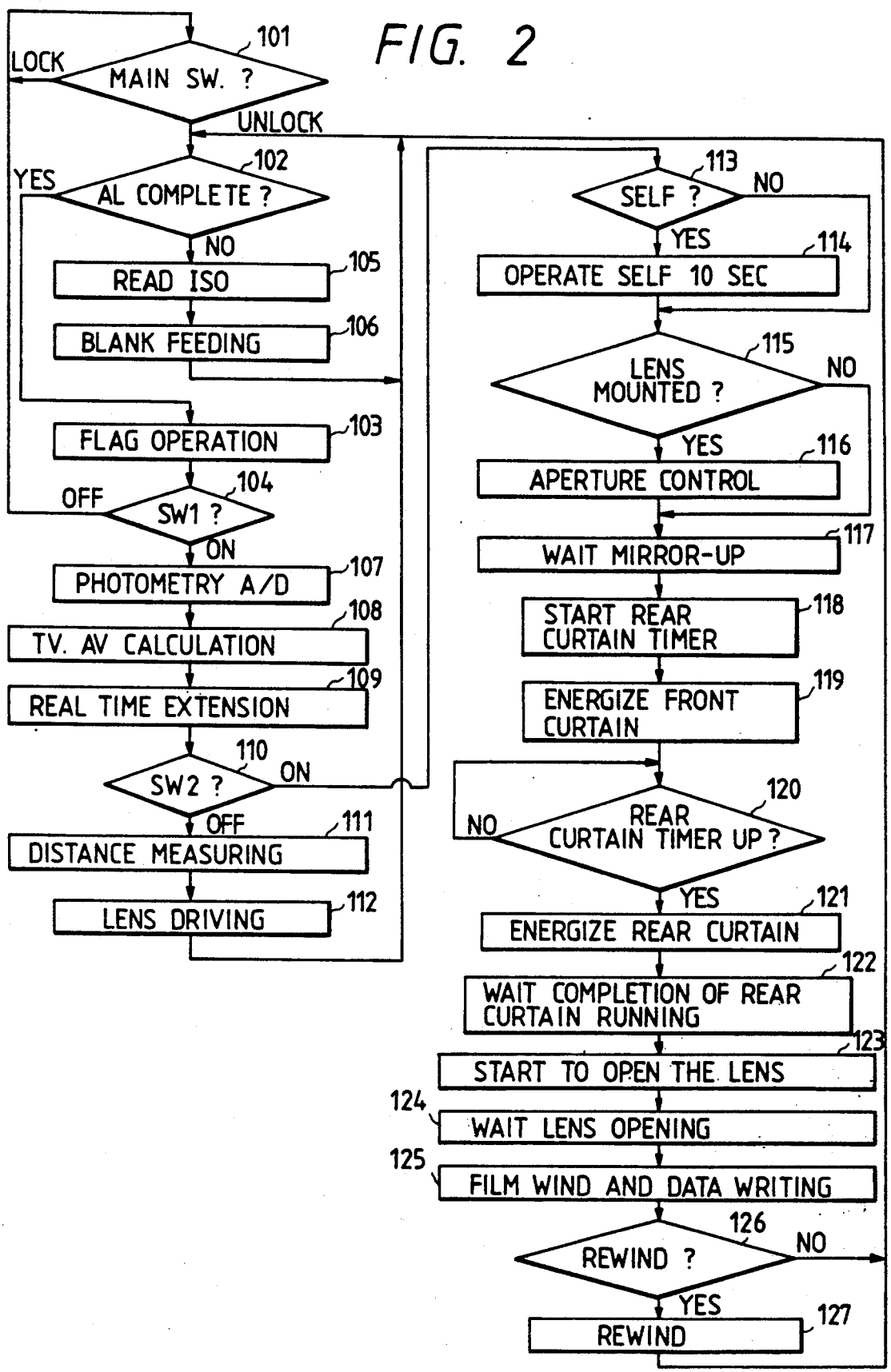

The operations of the circuits of FIG. 1 will now be described with reference to the flow chart of FIG. 2 which shows the operation of the microprocessor 1.

When the main switch 6 is in the LOCK position, the microprocessor does not receive the other switch inputs, and when the main switch 6 assumes any position other than the LOCK position, advance is made from a step 101 to a step 102, where determination is made as to whether auto-loading (AL) has been completed. If auto-loading is not completed, at a step 105, the ISO information is read (this operation will be described later in detail with reference to FIG. 4), and at the next step 106, the blank feeding of the film 9 to the first frame is effected by the motor driver circuit 14. When auto-loading is completed, at a step 103, a flag process (which will be described later in detail with reference to FIG. 3) is carried out, whereafter at a step 104, whether the switch SW1 is ON or OFF is judged. If the switch SW1 is OFF, return is made to the step 101, and if the switch is ON, advance is made to steps 107 and so on.

At the step 107, a photometry value is found by the use of the photometry circuit 2 and it is A/D-converted, and advance is made to a step 108, where TV and AV information is determined on the basis of a program graph, and with regard to the TV information, real time extension is effected at the next step 109. At a step 110, whether the release switch SW2 is ON or OFF is judged. During the first stroke of the release button, the release switch SW2 is still in its OFF state and therefore in this case, advance is made to a step 111, where distance measurement information is obtained by the use of the distance measuring circuit 3, and at the next step 112, the photo-taking lens is driven to the in-focus position by the lens driver circuit 15.on the basis of said distance measurement information. If the release switch SW2 is closed thereafter, advance is made to steps 113 and so on.

At the step 113, whether the main switch 6 is in the SELF position is judged, and if the main switch is in this position, advance is made to a step 114, where a self timer time of e.g. 10 seconds is counted, and advance is made to a step 115. If the main switch is not in the SELF position, but is in the PROGRAM position, advance is immediately made from the step 113 to a step 115. At the step 115, whether the lens is mounted is judged, and if the lens is not mounted, advance is made to a step 117, and if the lens is mounted, advance is made to a step 116, where aperture control is effected on the basis of said AV information, and advance is made to the step 117. At the step 117, an up movement of a jump-up mirror is waited for, and upon completion of the mirror-up, at a step 118, a rear curtain timer is started on the basis of the TV information subjected to real time extension at the step 109. At the next step 119, a front shutter curtain is electrically energized by the shutter control circuit 4, and at a step 120, the completion of a rear curtain timer is waited for, whereafter advance is made to a step 121, where a rear shutter curtain is electrically energized, and at a step 122, the completion of the running of the rear shutter curtain is waited for, and the exposure of the film 9 is completed. When the above-described operation is terminated, advance is made to a step 123, where the opening of the lens stopped down by the aperture control circuit 5 is started, and at a step 124, the opening of the lens is waited for. At the next step 125, one-frame winding of the film by the motor driver circuit 14 and the writing of data onto the magnetic memorizing portion of the film by the magnetic recording circuit 10 (this operation will be described later in detail with reference to FIG. 5) are effected, and if at a step 126, the film 9 is not in a state in which it is to be rewound, return is directly made to the step 102, and if the film is in a state in which it is to be rewound, advance is made to a step 127, where the film is rewound by the motor driver circuit 14, whereafter return is made to the step 102.

FIG. 3 shows the flag process, at the step 103. When at a step 201, the renewal of date information is discriminated by the timer circuit 12, that is, the change from 23:59 to 0:00 is discriminated, advance is made to a step 202, where the date information writing flag F is set to "1".

FIG. 4 shows the reading of the ISO information during the auto-loading of the step 105. First, at step 301, a coincidence flag P is reset to "0". At the next step 302, the ISO information on the film cartridge 8 is read by the ISO reader means 7, and this information is defined as "A", and then at a step 303, the ISO information is read from the magnetic memorizing portion of the film 9 being idly fed, by the magnetic head 11, and this information is defined as "B". At a step 304, the ISO information A and the ISO information B are compared with each other, and if these two types of information coincide with each other, at a step 306, the coincidence flag P is set to "1", and at a step 307, the coincident information is used as the ISO information. On the other hand, if these two types of information do not coincide with each other, the coincidence flag is not produced, and advance is made to a step 307, where the information A read from the film cartridge 8 is used as the ISO information. At a step 308, the date information writing flag F is set to "1" because of it being the first frame after auto-loading.

Figure 5:
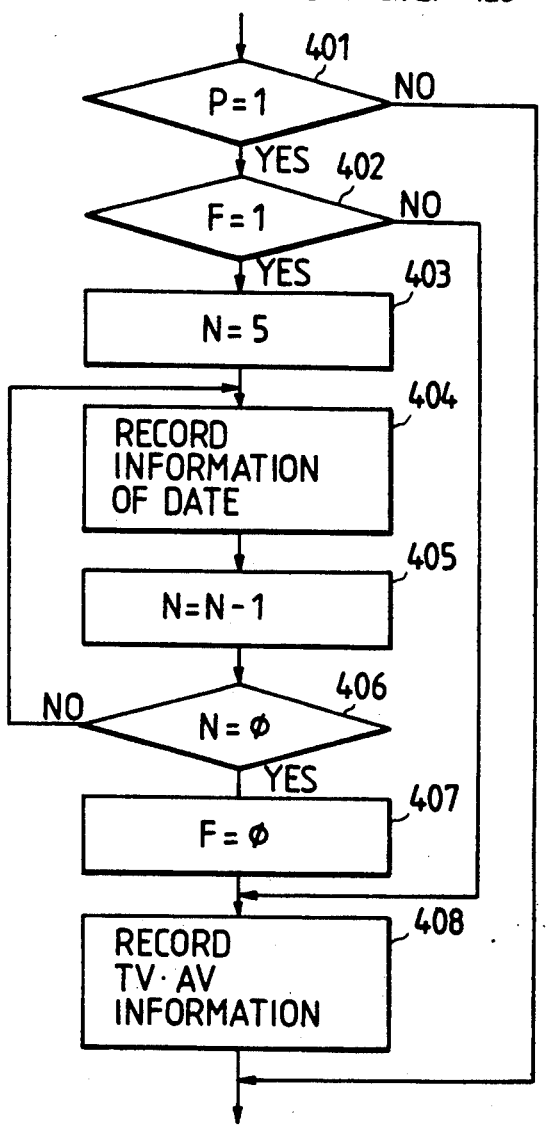

FIG. 5 shows the writing of data effected during the film winding at the step 125. First, at a step 401, whether or not the coincidence flag P is "1" is judged, and if "P=0", that is, the ISO information A and the ISO information B are not coincident with each other, the writing of information onto the film 9 by the magnetic head 11 to be effected at steps 402–408 is not effected. This is because a possibility exists that the magnetic head 11 is not normally operating. If "P=1", advance is made to the step 402, where whether the date information writing flag F is "1" is judged. If "F=0", the writing of date information to be effected at steps 402–407 is omitted (the reason for this will be set forth later with reference to FIG. 6). If "F=1", advance is made to the step 403, where the number of times N of date information writing is set (in the present embodiment, 5), and at the next step 404, the writing of date information onto the magnetic memorizing portion of the film 9 is effected from the magnetic recording circuit 10 by the magnetic head 11, and then at the step 405, "1" is subtracted from the number of times N of writing. This writing operation is repetitively performed until "N=0" is discriminated at the step 406. At the step 406, "N=0" is discriminated, whereby advance is made to the step 407, where the flag F is reset to "0", and at the next step 408, the then TV and AV information is written only one time from the magnetic recording circuit 10 onto the magnetic memorizing portion of the film 9 by the magnetic head 11 and thus, the writing of the information onto the magnetic memorizing portion of the film 9 by the magnetic head 11 is terminated.

The reason why at the steps 403 to 406, the writing of important information such as the date is effected a plurality of times is that if an error in the writing of said information should be caused by fluctuation or the like of the film feeding speed, wrong information will be transmitted. That is, in the present embodiment, as will be described later, design is made such that in the case of one and the same date, writing is effected on only the first frame. Therefore, if the writing thereon is not effected successfully, when all the frames photographed on the same day were photographed will become unknown. This will bring about an inconvenience such as when the images on the film and information contingent thereto such as date information are to be appreciated later by the use of an image reproducing apparatus. Consequently, design is made such that important information is written a plurality of times to thereby prevent wrong information accompanying a writing error or a reading error from being transmitted.

Also, herein, date information is taken as an example, but a more fatal error may result when information is to be used in photographing later, as when for example, trimming information is written onto the film and during the printing after development, the photographing magnification is changed in a dummy manner by the use of that information. In this respect, as in the present embodiment, information is written onto the film a plurality of times, whereby plural times of reading-out are effected during the reading-out of the information and compared with one another to thereby enable the detection of right information and thus, photographing using such information will be properly carried out later.

For example, statistically supposing a system which causes an error per 10,000 times, the probability with which an error is caused is 1/10,000 when writing is effected only one time, but the probability with which an error is caused three times per five times is $1/10,000^3$ when writing is effected five times and the reading-out of information is effected under majority rule during reading out, and the probability of error is remarkably decreased.

FIGS. 6(1) and 6(2) show the written states of date information onto the film 9.

FIG. 6(1) shows the case of the prior art and as shown, date information is written for all frames. However, in the present embodiment, when as described with respect to the step 402 of FIG. 5, "F=0", that is, photographing is effected on some frames on the same day when photographing was effected one time, the writing of the information is not effected for the subsequent frames and therefore, the state as shown in FIG. 6(2) is brought about. Here, the first to fourth frames, the fifth and sixth frames, and the seventh to tenth frames indicate that photographing was effected on the same day.

According to the present embodiment, design is made such that recorded information, if regarded later as important, is repetitively written for one frame and therefore, by information written a plurality of times being compared during reading-out, the probability with which wrong information by a writing error or a reading error is transmitted is sharply decreased.

In the above-described embodiment, the writing of information onto the magnetic memorizing portion of the film is effected plural times for important information and one time for unimportant information, but the number of times of this writing may be any number of times or set to any number of stages as required.

Also, in the above-described embodiment, the number of times of writing information onto the magnetic memorizing portion of the film is varied in conformity with the degree of importance of the information, but when all information is considered to be important, the present invention also of course covers a case wherein all information is written a predetermined number of times or plural times conforming to the degree of importance.

Further, in the above-described embodiment, there is shown a case wherein information is written onto the magnetic memorizing portion of the film, but of course, the present invention can also be applied to a case wherein information is written onto another image recording medium such as a magnetic tape or a floppy disk or an information recording portion.

Furthermore, in the above-described embodiment, the writing of important information onto the magnetic memorizing portion of the film is effected a plurality of times, but of course, the present invention is equally applicable to a case wherein the reading-out of important information from the magnetic memorizing portion of the film is effected a plurality of times.

What is claimed is:

1. A camera using film having a magnetic memorizing portion that includes a plurality of frames, said camera comprising:
   writing means for writing the same information a plurality of times onto the same frame of the magnetic memorizing portion of the film; and
   varying means for varying the number of times of writing the information by said writing means in conformity with the substance of the information.

2. A camera according to claim 1, wherein said varying means comprises means for automatically varying the number of times of the writing in conformity with the substance of the information.

3. A camera according to claim 1, wherein said varying means comprises means for automatically varying the number of times of the writing in conformity with the degree of importance of the information.

4. A camera according to claim 1, wherein said writing means comprises a magnetic head.

5. A camera using film having a magnetic memorizing portion that includes a plurality of frames, said camera comprising:
   writing means for wiring information onto the magnetic memorizing portion of the film; and
   control means for effecting the writing of the same information by said writing means on the same frame of the film a plurality of times.

6. A camera according to claim 5, wherein said control mean comprises means for varying the number of times of writing the information by said writing means in conformity with the substance of the information.

7. A camera according to claim 5, wherein said control means comprises means for automatically varying the number of times of the writing information by said writing means in conformity with the substance of the information.

8. A camera according to claim 5, wherein said control means comprises means for varying the number of times of writing the information by said writing means in conformity with the degree of importance of the information.

9. A camera according to claim 6, wherein said control means comprises means for automatically varying the number of times of writing the information by said writing means in conformity with the degree of importance of the information.

10. A camera according to claim 5, wherein said control means comprises varying means for varying the number of times of writing the information and said writing means comprises means for effecting the writing of the same information on the same frame of the film of number of times varied by said varying means.

11. A camera using film having a magnetic memorizing portion that includes a plurality of frames, said camera comprising:
    writing means for writing the same information a plurality of times onto the same frame of the magnetic memorizing portion of the film; and
    setting means for setting the number of times of writing the information by said writing means to a plurality of times in conformity with the substance of the information.

12. A camera according to claim 11, wherein said setting means comprises means for automatically setting the number of times of the writing to a plurality of times in conformity with the substance of the information.

13. A camera according to claim 11, wherein said setting means comprises means for automatically setting the number of times of the writing to a plurality of times in conformity with the degree of importance of the information.

14. A camera according claim 11, wherein said writing means comprises a magnetic head.

15. A camera comprising:
    writing means for writing information differing from an image onto an image recording medium having a magnetic memorizing portion that includes a plurality of frames, said writing means comprising means for writing the same information a plurality of times onto the same frame of the magnetic memorizing portion; and
    varying means for varying the number of times of writing the information by said writing means in conformity with the substance of the information.

16. A camera according to claim 15, wherein said varying means comprises means for automatically varying the number of times of the writing in conformity with the substance of the information.

17. A camera according to claim 15, wherein said varying means comprises means for automatically varying the number of times of the writing in conformity with the degree of importance of the information.

18. A camera according to claim 15, wherein said writing means comprises a magnetic head.

19. A camera comprising:
a writing means for writing information differing from an image onto an image recording medium having a magnetic memorizing portion that includes a plurality of frames, said writing means comprising means for writing the same information a plurality of times onto the same frame of the magnetic memorizing portion; and
control means for controlling the writing of the same information by said writing means on the same frame of the image recording medium a plurality of times.

20. A camera according to claim 19, wherein said control means comprises means for varying the number of times of writing the information by said writing means in conformity with the substance of the information.

21. A camera according to claim 19, wherein said control means comprises means for automatically varying the number of times of writing the information by said writing means in conformity with the substance of the information.

22. A camera according to claim 19, wherein said control means comprises means for varying the number of times of writing the information by said writing means in conformity with the degree of importance of the information.

23. A camera according to claim 19, wherein said control means comprises means for automatically varying the number of times of writing the information by said writing means in conformity with the degree of importance of the information.

24. A camera according to claim 22, wherein said control means comprises varying means for varying the number of times of writing the information, and said writing means comprises means for effecting the writing of the same information on the same frame of the image recording medium a number of times varied by said varying means.

25. A camera comprising:
writing means for writing information differing from an image onto an image recording medium having a magnetic memorizing portion that includes a plurality of frames, said writing means comprising means for writing the same information a plurality of times onto the same frame of the magnetic memorizing portion; and
setting means for setting the number of times of writing the information by said writing means to a plurality of times in conformity with the substance of the information.

26. A camera according to claim 25, wherein said setting means comprises means for automatically setting the number of times of the writing to a plurality of times in conformity with the substance of the information.

27. A camera according to claim 25, wherein said setting means comprises means for automatically setting the number of times if the writing to a plurality of times in conformity with the degree of importance of the information.

28. A camera according to claim 28, wherein said writing means comprises a magnetic head.

29. An information writing apparatus for a camera using film having a magnetic memorizing portion that includes a plurality of frames, said apparatus comprising:
writing means for writing the same information a plurality of times onto the same frame of the magnetic memorizing portion of the film; and
varying means for varying the number of times of writing the information by said writing means in conformity with the substance of the information.

30. An information writing apparatus for a camera using film having a magnetic memorizing portion that includes a plurality of frames, said apparatus comprising:
writing means for writing the same information a plurality of times onto the frame of the magnetic memorizing portion of the film; and
control means for controlling the writing of the same information by said writing means on the same frame of the film a plurality of times.

31. An information writing apparatus for a camera using film having a magnetic memorizing portion that includes a plurality of frames, said apparatus comprising:
writing means for writing the same information a plurality of times onto the same frame of the magnetic memorizing portion of the film; and
setting means for setting the number of times of writing the information by said writing means to a plurality of times in conformity with the substance of the information.

32. An information writing apparatus for a camera comprising:
writing means for writing information differing from an image onto an image recording medium having a magnetic memorizing portion that includes a plurality of frames, said writing means comprising means for writing the same information a plurality of times onto the same frame of the magnetic memorizing portion; and
varying means for varying the number of times of writing the information by said writing means in conformity with the substance of the information.

33. An information writing apparatus for a camera comprising:
writing means for writing information differing from an image onto an image recording medium having a magnetic memorizing portion that includes a plurality of frames, said writing means comprising means for writing the same information a plurality of times onto the same frame of the magnetic memorizing portion; and
control means for controlling the writing of the same information by said writing means on the same frame of the image recording medium a plurality of times.

34. An information writing apparatus for a camera comprising:
writing means for writing information differing from an image onto an image recording medium having a magnetic memorizing portion that includes a plurality of frames, said writing means comprising means for writing the same information a plurality of times onto the same frame of the magnetic memorizing portion; and
setting means for setting the number of times of writing the information by said writing means to a plurality of times in conformity with the substance of the information.

* * * * *

UNITED STATES PATENT AND TRADEMARK OFFICE
CERTIFICATE OF CORRECTION

PATENT NO. : 5,187,511
DATED : February 16, 1993
INVENTOR(S) : Kenichiro Amano

It is certified that error appears in the above-identified patent and that said Letters Patent is hereby corrected as shown below:

<u>ON THE COVER PAGE</u>, Item [54] and Column 1, line 2,

"MANGETIC" should read --MAGNETIC--.

Item [56]
<u>UNDER "REFERENCES CITED"</u>

Insert
--FOREIGN PATENT DOCUMENTS

Patent Abstracts of Japan, Kokai No. 60-089872, Vol. 9, No. 236, 9/1985--;
Patent Abstracts of Japan, Kokai No. 61-113171, Vol. 10, No. 298, 10/1986.--.

<u>COLUMN 1</u>

Line 1, "MANGETIC" should read --MAGNETIC--; and
Line 11, "and" should read --and for--.

<u>COLUMN 2</u>

Line 31, "where" should read --where a--.

UNITED STATES PATENT AND TRADEMARK OFFICE
CERTIFICATE OF CORRECTION

PATENT NO. : 5,187,511
DATED : February 16, 1993
INVENTOR(S) : Kenichiro Amano It is certified that error appears in the above-identified patent and that said Letters Patent is hereby corrected as shown below:

COLUMN 6

Line 12, "the writing" should read --writing the--; and
    Line 20, "claim 6," should read --claim 5,--.

COLUMN 7

Line 5, "comprising: a" should read --comprising:--;
    Line 37, "claim 22," should read --claim 19,--; and
    Line 62, "if" should read --of--.

Signed and Sealed this

First Day of March, 1994

BRUCE LEHMAN

*Attest:*

*Attesting Officer*     *Commissioner of Patents and Trademarks*